US010889062B2

(12) United States Patent
Simske et al.

(10) Patent No.: US 10,889,062 B2
(45) Date of Patent: Jan. 12, 2021

(54) CREATE A SURFACE IDENTIFIER USING A SHAPE MEMORY MATERIAL

(71) Applicant: Hewlett-Packard Development Company, L.P., Houston, TX (US)

(72) Inventors: Steven J. Simske, Fort Collins, CO (US); Guy Adams, Bristol (GB)

(73) Assignee: Hewlett-Packard Development Company, L.P., Spring, TX (US)

(*) Notice: Subject to any disclaimer, the term of this patent is extended or adjusted under 35 U.S.C. 154(b) by 116 days.

(21) Appl. No.: 16/098,093

(22) PCT Filed: Jun. 17, 2016

(86) PCT No.: PCT/US2016/038122
§ 371 (c)(1),
(2) Date: Oct. 31, 2018

(87) PCT Pub. No.: WO2017/218008
PCT Pub. Date: Dec. 21, 2017

(65) Prior Publication Data
US 2019/0152151 A1    May 23, 2019

(51) Int. Cl.
*B32B 3/02* (2006.01)
*B29C 64/386* (2017.01)
(Continued)

(52) U.S. Cl.
CPC .......... *B29C 64/386* (2017.08); *B29C 64/106* (2017.08); *B33Y 50/00* (2014.12); *B33Y 70/00* (2014.12); *B33Y 10/00* (2014.12)

(58) Field of Classification Search
CPC ..... B29C 64/106; B29C 64/386; B33Y 10/00; B33Y 50/00; B33Y 70/00
See application file for complete search history.

(56) References Cited

U.S. PATENT DOCUMENTS 7,951,319 B2    5/2011  Sherman et al.
7,963,694 B2    6/2011  Leute et al.
(Continued)

FOREIGN PATENT DOCUMENTS

WO    WO-2014114907    7/2014
WO    WO-2014204634    12/2014

OTHER PUBLICATIONS

Ayers, R. A., et al. "Effect of nitinol implant porosity on cranial bone ingrowth and apposition after 6 weeks." Journal of Biomedical Materials Research: An Official Journal of The Society for Biomaterials, The Japanese Society for Biomaterials, and The Australian Society for Biomaterials 45.1 (1999): 42-47.
(Continued)

*Primary Examiner* — Elizabeth E Mulvaney
(74) *Attorney, Agent, or Firm* — HP Inc. Patent Department (57) ABSTRACT

Examples disclosed herein relate to creating a surface identifier using a shape memory material. In one implementation, a processor determines a first property value of the surface identifier associated with a first phase and a second property value of the surface identifier associated with a second phase. A manufacturing device may create a surface identifier using a shape memory material. In one implementation, the surface identifier is created in a manner that causes the surface identifier to exhibit the first property value when the shape memory material is in a first phase and to exhibit the second property value when the shape memory material is in a second phase.

15 Claims, 4 Drawing Sheets

(51) Int. Cl.
  B33Y 70/00   (2020.01)
  B29C 64/106  (2017.01)
  B33Y 50/00   (2015.01)
  B33Y 10/00   (2015.01)

(56) References Cited

U.S. PATENT DOCUMENTS

| | | |
|---|---|---|
| 2007/0163686 A1 | 7/2007 | Zhang et al. |
| 2012/0236632 A1 | 9/2012 | Watson et al. |
| 2012/0279101 A1 | 11/2012 | Pretsch et al. |
| 2015/0119238 A1 | 4/2015 | Pretsch et al. |

OTHER PUBLICATIONS

Ayers, R. A., et al. "Porous NiTi as a material for bone engineering." In Shape memory implants, pp. 73-88. Springer, Berlin, Heidelberg, 2000.

Grunewald, Scott J. "3D Printing Goes 4D with Smart Memory Materials That Self-Assemble", 3D Design, 3D Printing, 3D Printing Materials, Sep. 22, 2015, https://3dprint.com/96864/4d-smart-memory-materials/.

Simske, S. J. et al. "Cranial bone apposition and ingrowth in a porous nickel-titanium implant." Journal of biomedical materials research 29, No. 4 (1995): 527-533.

CREATE A SURFACE IDENTIFIER USING A SHAPE MEMORY MATERIAL

BACKGROUND

A shape memory material, such as shape memory metal alloy Nitinol, may have different properties according to a phase of the material. For example, the shape memory material may be stiffer, stronger, or more resilient at a higher temperature in a first phase and may change into a more malleable, weaker, or more fragile material at a lower temperature in a second phase.

BRIEF DESCRIPTION OF THE DRAWINGS

The drawings describe example embodiments. The following detailed description references the drawings, wherein.

DETAILED DESCRIPTION

In one implementation, a surface identifier may be created using a shape memory material. For example, a processor may identify a surface identifier to associate with an object. The surface identifier may be a text, image, and/or haptic surface identifier, such as a surface identifier used for object identification and/or serialization. The surface identifier may be attached or otherwise associated with the object, such as where the surface identifier is created directly on the object or such that the surface identifier is created and then affixed to the object. For example, the surface identifier may be a label and/or an identifier directly incorporated onto the associated object. A processor may determine a first property value of the surface identifier associated with a first phase and a second property value of the surface identifier associated with a second phase, such as based on stored information associated with the surface identifier. A manufacturing device may create the surface identifier using a shape memory material, and the surface identifier may be created in a manner that causes the surface identifier to exhibit the first property value when the shape memory material is in a first phase and to exhibit the second property when the shape memory material is in a second phase. For example, an optical or haptic property may change to a predetermined value when the shape memory material later changes phases.

In one implementation, a shape memory material is positioned to receive a surface identifier, and a surface identifier is printed on the shape memory material or on a material affixed to the shape memory material, such as using traditional or 3D printing. For example, the shape memory material may be caused to enter or maintain a martensitic or austenitic phase by changing or maintaining a temperature level of the shape memory material, and the surface identifier may be printed onto the shape memory material while it is in the selected phase. The printing may be performed such that a property of the surface identifier changes to a predetermined value when the shape memory material transitions to a different phase.

In one implementation, a shape memory material is positioned such that the position of the shape memory material helps form the surface identifier. For example, a raised portion of the shape memory material may form part of the surface identifier, such as a braille or other suitable format for haptic, or somatosensory validation. As another example, a shape memory material may expand causing an adjacent surface identifier to be compressed and shrink, changing the optical property of the surface identifier.

A surface identifier created using a shape memory material may allow for a more dynamic surface identifier, such as with stages associated with the surface identifier or with changes in visibility where some portions of the surface identifier are covert under some conditions. In some cases, a surface identifier with different properties at different phases may be used for a workflow or other sequential authentication or identification process, such as where the shape memory material is caused to be in a first phase for a first authentication stage and is caused to be in a second phase for a second authentication stage such that the same surface identifier may be used for each. As another example, a surface identifier created using a shape memory material may allow for a portion or the entirety of the surface identifier to be hidden during a first phase such that it is protected or covert. In one example, a shape memory material is used as a surface identifier for an object and hidden when the object with the surface identifier is ready for a consumer, such as by using the shape memory material properties to cover the identifier or to cause another material to cover the surface identifier.

Figure 1:
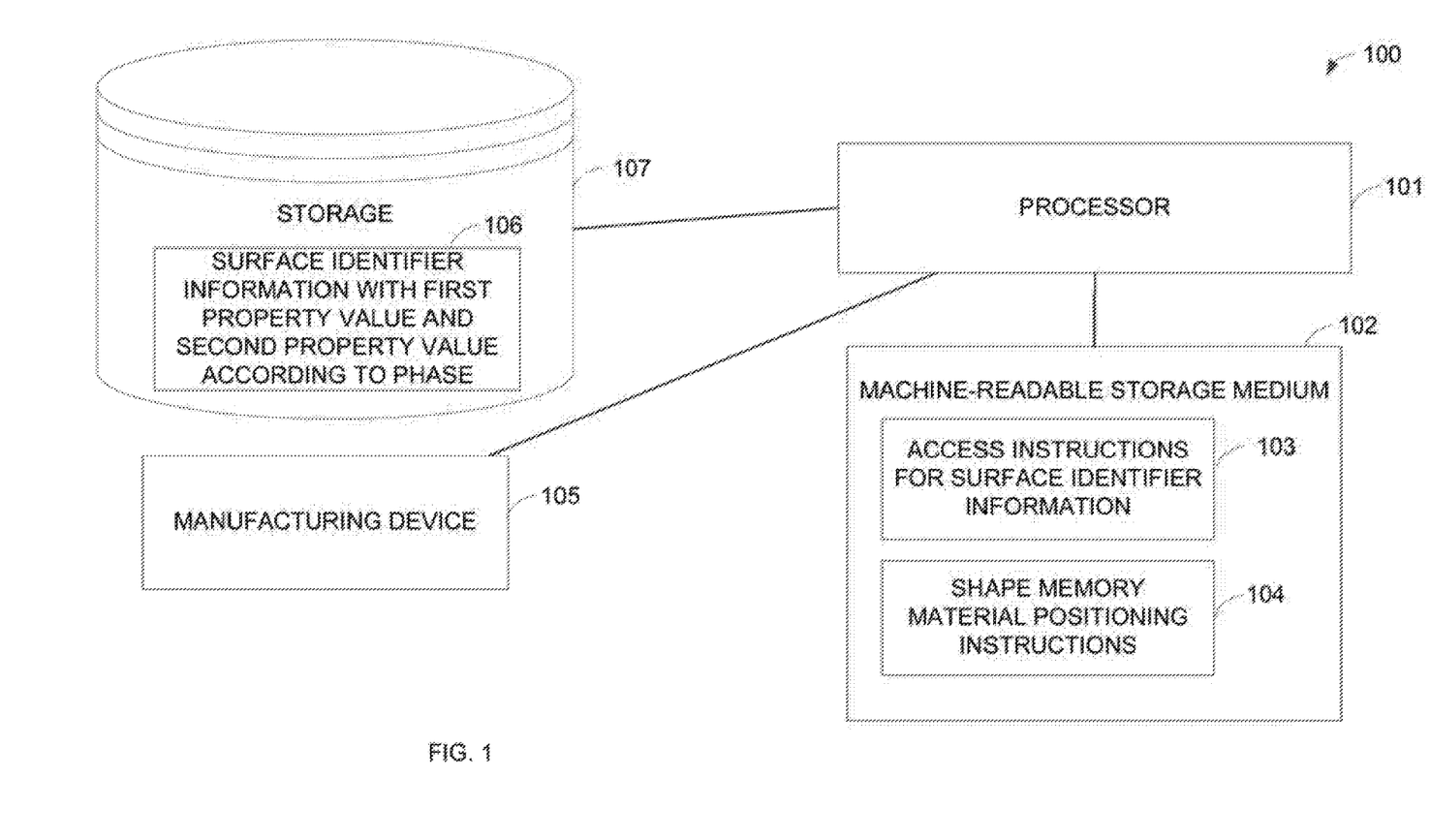
FIG. 1 is a block diagram illustrating one example of a computing system to create a surface identifier using a shape memory material.

FIG. 1 is a block diagram illustrating one example of a computing system to create a surface identifier using a shape memory material. The computing system 100 may create a surface identifier using a shape memory material such that a value of a property of the surface identifier changes when the shape memory material changes phases. As an example, an optical or haptic property of the surface identifier may be different according to the phase of the shape memory material. The shape memory material may be any suitable shape memory material, such as a shape memory alloy or a shape memory polymer. The shape memory material may have a martensite phase and austenite phase such that the shape memory material exhibits different characteristics in the different phases, and the shape memory material may transition between phases based on a change in conditions, such as temperature. The shape memory material may be used to create a dynamic surface identifier that has different properties according to the phase of the shape memory material. The computing system 100 includes a storage 107, processor 101, machine-readable non-transitory storage medium 102, and a manufacturing device 105.

The storage 107 may be any suitable storage device to store information related to a surface identifier. The processor 101 may communicate with the storage 107 to store and retrieve information. The storage 107 may be part of the same computing device as the processor 101 or may communicate with the processor 101 via a network. In one implementation, the storage 107 and the machine-readable storage medium 102 are included in the same device.

The storage 107 may store surface identifier information with first property value and second property value according to phase 106. The surface identifier may be any suitable surface identifier, such as a surface identifier for identification, serialization, or authentication. The surface identifier may be a text, image, of haptic surface identifier. The property values may be any suitable property values, such as related to optical and/or haptic properties. The storage 107 may store a set of surface identifiers or information used to create a surface identifier, such as set of features or serialization information associated with a surface identifier. The surface identifier may be, for example, a watermark, barcode, or other data bearing image, and stored information may related to data to be included in the data bearing image.

The manufacturing device 105 may be any suitable manufacturing device for positioning shape memory material. For example, the manufacturing device 105 may be a 3D printer that uses an additive manufacturing process to create a structure from individual voxels of a shape memory material. In one implementation, the manufacturing device 105 is a device that deposits a shape memory material in particular locations, such as using a surface manufacturing method. The manufacturing device 105 or another device may create an object and/or attach the shape memory material to the object. For example, a 3D printer may create an object and 3D print a surface identifier onto the object, or a surface identifier may later be attached to the 3D printed object using an adhesive or other material.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include access instructions for surface identifier information 103 and shape memory material positioning instructions 104.

The access instructions for surface identifier information 103 may be any suitable instructions to access a surface identifier from the storage 106. For example, the processor 101 may access a surface identifier associated with a specific object that the shape memory material is attached to and/or to be attached to in a later production process. In one implementation, the processor 101 determines information related to the surface identifier, such as a code, and stores it in the storage 106 for later authentication. The surface identifier may represent an identification or serialization code of an object to which the shape memory material is affixed.

The shape memory positioning instructions 105 may include instructions to position a shape memory material such that it may be used to form and/or receive a surface identifier. For example, the shape memory positioning instructions 105 may include instructions to the manufacturing device 105. The shape memory material may be positioned in a manner such that a phase change of the shape memory material alters a property of the surface identifier, such as where the shape memory material forms part of the surface identifier, where the shape memory material has a surface identifier affixed to or printed onto the shape memory surface identifier, or where the phase change of the shape memory material affects an adjacent or nearby surface identifier on a different material. Creating the surface identifier may involve both positioning the shape memory material and another material. In one implementation, creating the surface identifier involves traditional printing or 3D printing on the shape memory material or a material located in a position to be affected by the phase change of the shape memory material. For example, the surface identifier may be printed on or otherwise added to the shape memory material while the shape memory material is in a selected phase. The surface identifier may be printed on the shape memory material while the shape memory material is in the first phase such that a property of the surface identifier is altered when the shape memory material enters another phase. In some cases, additional information is printed on or otherwise added to the surface identifier when the shape memory material is in a second phase.

In one implementation, the computing system 100 includes a printer for printing information onto the shape memory material. For example, a traditional or 3D printer may be used to print onto the shape memory material and/or to print an item to attach to the shape memory material. For example, the processor 101 may determine a phase associated with a surface identifier or portion of a surface identifier based on information stored in the storage 106 associated with the surface identifier. The phase may be any suitable phase, such as an austenite or martensitic phase of a shape memory material. The processor 101 may cause the shape memory material to enter the selected phase in any suitable manner. For example, the processor 101 may cause the shape memory material to be heated or cooled to a particular temperature. The printer may print information onto the shape memory material when the shape memory material is in the selected phase and/or a printed item may be attached to the shape memory material when it is in the selected phase. In one implementation, the processor then causes the shape memory material to enter a second phase, and the printer prints additional information on the shape memory material while the shape memory material is in the second phase.

As an example, the property that changes according to the shape memory material phase may be an optical or haptic property of the surface identifier, or both. In one implementation, a value of an optical property of the surface identifier changes when the shape memory material changes from a first phase to a second phase. The optical property of the surface identifier that changes when the shape memory material changes phases may be, for example, size, shape, color, transparency, emission, florescence, revelation of a holographic element, plasmonic effect, and concealment of a holographic element. A haptic property of the surface identifier may change when the shape memory material changes phases. For example, a guidance element may provide haptic guidance to the surface identifier when the shape memory material is in a particular phase. As another example, the surface variation of the surface identifier may be used to convey information that may be interpreted by a device. In one implementation, the surface identifier may be printed on the shape memory material such that a portion of it is covert in a first phase and visible in a second phase, such as where the surface identifier is unreadable in a first phase, or vice versa.

The processor 101 may determine information about creating the surface identifier in addition to the shape memory material to create the target effect. For example, the ink selected, position of the surface identifier, or other variables may be selected based on a target phase change to the surface identifier.

Figure 2:
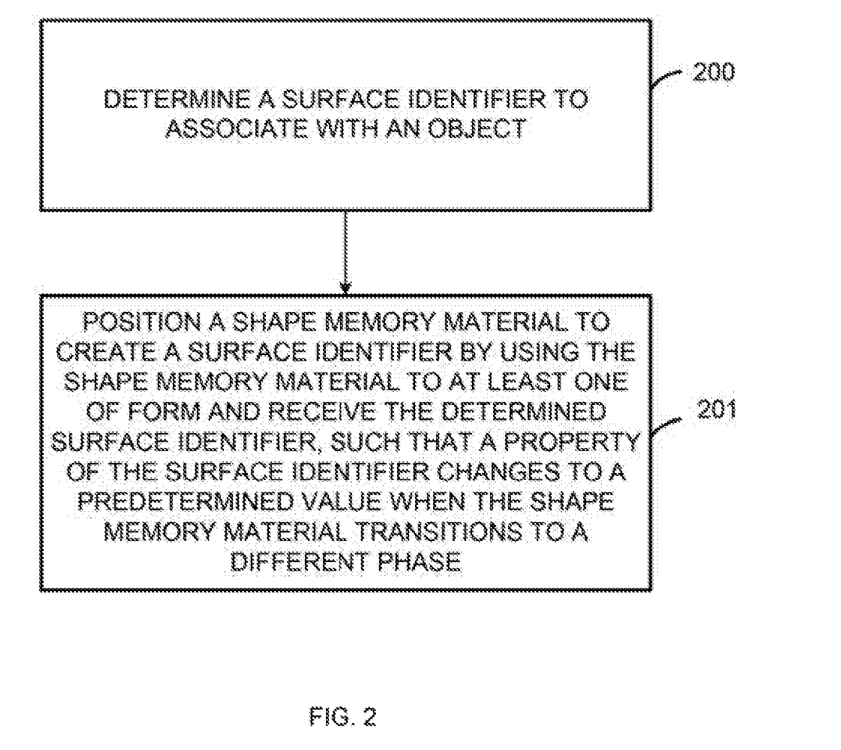
FIG. 2 is a flow chart illustrating one example of a method to create a surface identifier using a shape memory material.

FIG. 2 is a flow chart illustrating one example of a method to create a surface identifier using a shape memory material. For example, a surface identifier may be created using a shape memory material such that the surface identifier has a first value for a property when the shape memory material is in a first phase and a second value for a property when the shape memory material is in the second phase. The dynamic surface identifier may be advantageous for workflow tracking or authentication. The method may be implemented, for example, by the computing system 100 of FIG. 1.

Beginning at 200, a processor determines a surface identifier to associate with an object. For example, the processor may access information about the surface identifier from a storage. In one implementation, the processor stores information about the surface identifier in the storage. The processor may determine or update information associated with the surface identifier, such as where the processor generates and stores a serialization code.

The surface identifier may be any suitable type of surface identifier, such as a text, image, or haptic surface identifier. The surface identifier may be forensically imaged. For example, the surface identifier may have a physio-chemical characteristic that allows the surface identifier to be interpreted by a device such as a mass spectrometer. The surface identifier may be a data bearing image, such as a barcode, stenographic halftone, or watermark. The surface identifier may be used for any suitable purpose, such as for serialization or authentication. The object may be any suitable object, such as a custom object created using additive manufacturing. The surface identifier may be affixed or otherwise associated with the object. For example, a shape memory material may be affixed to the object using 3D printing, surface manufacturing, or other manufacturing techniques. Information may be printed onto the shape memory material prior to or after being affixed to the object.

Continuing to 201, a manufacturing device positions a shape memory material to create a surface identifier by using the shape memory material to form and/or receive the determined surface identifier. The shape memory material may be positioned such that a property of the surface identifier changes to a predetermined value when the shape memory material transitions to a different phase. For example, an optical or haptic property of the surface identifier may change according to the shape memory material phase.

The shape memory material may be any suitable shape memory material. As an example, the shape memory material may be a shape memory alloy or polymer. The shape memory material may be integrated into another material, such as a flexible non-shape memory material. The shape memory material may have two or more phases that are triggered by a condition. For example, the shape memory material may have an austenite phase and a martensite phase. The austenite phase may occur when the shape memory material is at a higher temperature and may result in a more rigid stronger material. The martensite phase may occur when the shape memory material is at a lower temperature and may result in a weaker more pliable material. Multiple shape memory materials or the same type of shape memory material may be positioned in different areas may be used to create a surface identifier. For example, the shape memory materials may have different trigger points to change phases such that additional surface identifier changes or stages may be created. As an example, different types of triggers for phases may be used, such as triggers related to temperature, electricity, magnetism, or pH.

A manufacturing device to position the shape memory material may be any suitable manufacturing device, such as a 3D printer or surface manufacturing device. The shape memory material may be positioned such that it is deposited or such that is positioned in the process of being created using an additive manufacturing process. The shape memory material may be positioned in any suitable manner to create the surface identifier. For example, the position of the shape memory material may vary in different voxels or regions, of a material such that the amount and/or position of the shape memory material in each region is used to create the target property change when the shape memory material changes phases. The surface identifier may convey data based on a change of an effect in different layers of the shape memory material and/or based on information visible from an outer layer of the surface identifier. A processor may determine the manner in which to position the shape memory material based on a target surface identifier design and target effect of a phase change of the shape memory material.

In one implementation, the shape memory material forms part of the surface identifier, such as where the shape memory material is used to create a haptic portion of the surface identifier. As another example, a different material may include a printed two-dimensional or three-dimensional surface identifier, and the shape memory material may be positioned such that it causes a change to information bearing portion of the surface identifier, such as where the shape memory material contracts and causes a different elastic material to compress changing the size of a surface identifier printed on the elastic material.

In one implementation, the shape memory material may directly receive the surface identifier, such as where a surface identifier is printed onto the shape memory material or a material affixed to the shape memory material using traditional and/or 3D printing techniques. Information may be printed onto the shape memory material or on another material affixed to the shape memory material such that the shape memory material forms an underlying layer. A surface identifier may be created on multiple materials such that a first portion is attached to a shape memory material and a second portion is attached to a different material. The surface identifier may be created both on shape memory material and such that adjacent shape memory material not directly part of the surface identifier affects a property of the adjacent material when a phase change occurs.

In one implementation, a processor causes the shape memory material to enter a first phase such that the surface identifier may be created and/or printed while the shape memory material is in the first phase. For example, the processor may increase a temperature until the shape memory material measures a particular temperature and/or exhibits a property indicating that it entered the target phase. In one implementation, a printer prints a surface identifier on the shape memory material or material affected by the shape memory material while the shape memory material is in the first phase, such that a property of the surface identifier changes when the shape memory material changes from the first phase to a second phase. The surface identifier may be a two-dimensional or three-dimensional surface identifier, such as where it is created using traditional or 3D printing. In one implementation, the same device or printer both positions the shape memory material on the object and prints a surface identifier on the shape memory material.

Figure 3A:
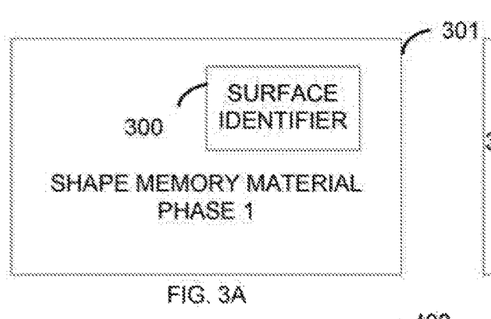
FIGS. 3A and 3B are diagrams illustrating examples of a change in an optical property of a surface identifier created using a shape memory material.
Figure 3B:
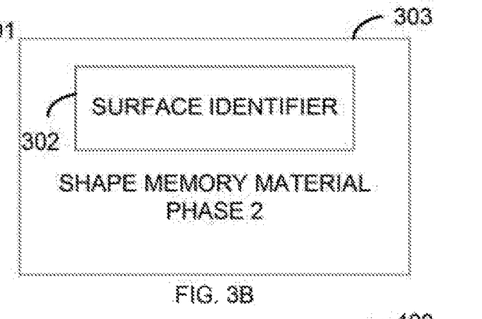

FIGS. 3A and 3B are diagrams illustrating examples of a change in an optical property of a surface identifier created using a shape memory material. FIG. 3A shows a portion of a shape memory material in a first phase 300 with a surface identifier 301 created using the shape memory material 301. FIG. 3B shows the shape memory material in a second phase 302 such that the surface identifier appears as surface identifier 303 with a different size when the shape memory material is in the second phase. For example, the surface identifier 303 may appear larger because it expands when the shape memory material is in a less rigid phase that does not compress the surface identifier.

Figure 4A:
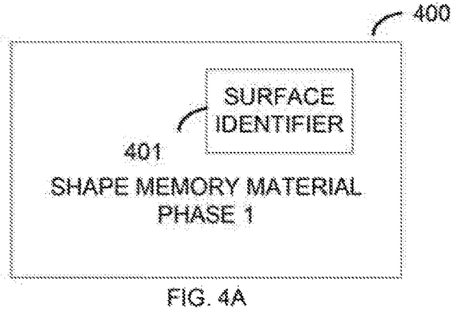
FIGS. 4A and 4B are diagrams illustrating examples of a change in a haptic property of a surface identifier created using a shape memory material.
Figure 4B:
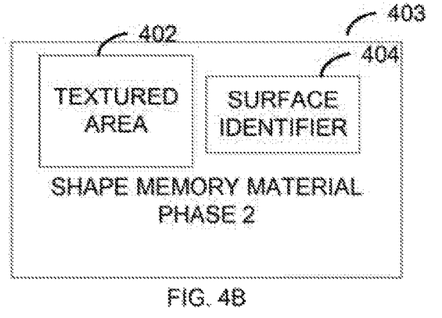

FIGS. 4A and 4B are diagrams illustrating examples of a change in a haptic property of a surface identifier created using a shape memory material. For example, a textured area may be covert when the shape memory material is in a first phase but overt when the shape memory material is in a second phase. FIG. 4A shows an example of the shape memory material in a first phase 400, and FIG. 4B shows an example of the shape memory material in a second phase 403. The surface identifier 401 appears in the shape memory material in the first phase 400, and the surface identifier appears as surface identifier 404 when the shape memory material is in the second phase 403. The surface identifier 404 may appear the same as the surface identifier 401 or may appear differently. The textured area 403 may appear when the shape memory material is in the second phase 403, and the textured area 403 may have a different texture or may be flat when the shape memory material is in the first phase 400. For example, an area associated with the surface identifier or adjacent to the surface identifier may be created from layers of a shape memory material that created a raised effect when the shape memory material is in a particular phase.

Figure 5A:
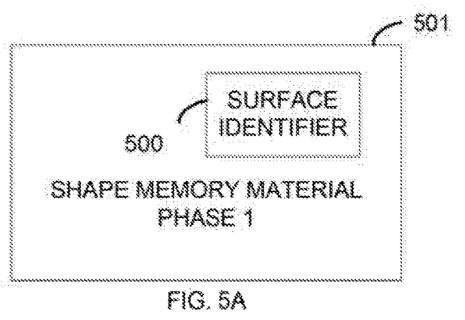
FIGS. 5A and 5B are diagrams illustrating examples of changing a surface identifier based on the phase of a shape memory material.
Figure 5B:
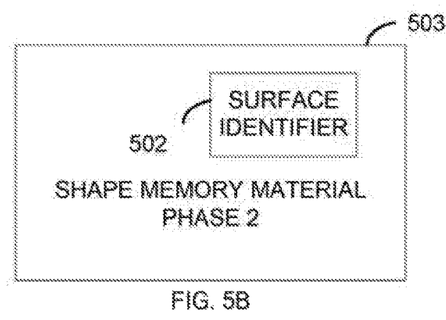

FIGS. 5A and 5B are diagrams illustrating examples of changing a surface identifier based on the phase of a shape memory material. FIG. 5A shows a shape memory material in a first phase 501 with a surface identifier 500 printed on or otherwise affixed to or affected by the shape memory material 501. FIG. 5B shows the shape memory material in a second phase 502 such that a different surface identifier 503 is visible. For example, the surface identifier 503 may appear such that the surface identifier 500 is covered by the surface identifier 503 when the shape memory material is in the second phase 502. As another example, the surface identifier 503 may be created from a portion of the surface identifier 500 with additional material visible in the second phase not apparent with the shape memory material is in the first phase.

Figure 6A:
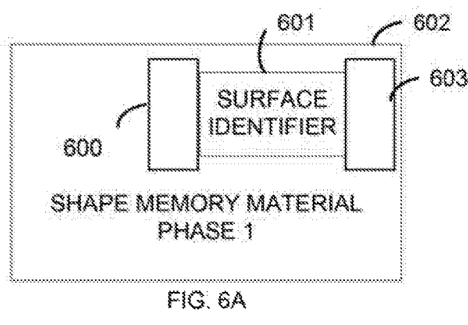
FIGS. 6A and 6B are diagrams illustrating examples of altering the visibility of a surface identifier created using a shape memory material.
Figure 6B:
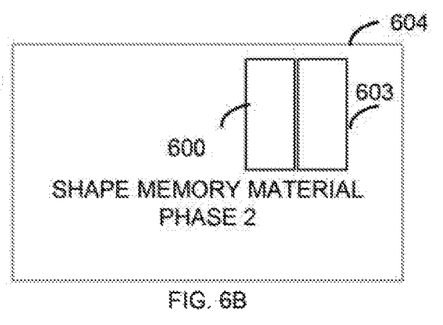

FIGS. 6A and 6B are diagrams illustrating examples of altering the visibility of a surface identifier created using a shape memory material. FIG. 6A shows shape memory material in a first phase 602. Micro-tiles 600 and 603 may be affixed to the shape memory material 602 such as with hinges or other attaching mechanisms. The micro-tiles 600 and 603 may be adjacent to a surface identifier 601 which may be attached to the shape memory material or may be created from a different material. FIG. 6B shows the shape memory material in a second phase 604. In the second phase, the shape memory material pushes or otherwise doses or connects the micro-tiles 600 and 603 such that the surface identifier 601 is no longer visible.

Figure 7:
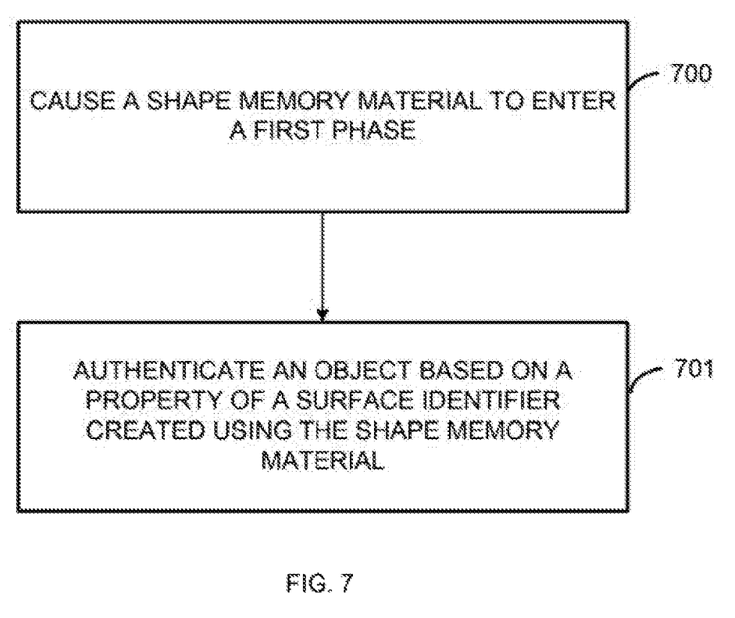
FIG. 7 is a diagram illustrating one example of a method to authenticate an object based on a surface identifier created using a shape memory material.

FIG. 7 is a diagram illustrating one example of a method to authenticate an object based on a surface identifier created using a shape memory material. For example, a surface identifier created using a shape memory material may include at least two phases of information with the same surface identifier. The method may be implemented by a computing system, such as a computing system including a processor and storage for authentication.

Beginning at 700, a shape memory material is caused to enter a first phase. For example, a shape memory material associated with a surface identifier may be heated or cooled to trigger a phase change.

Continuing to 701, a processor authenticates an object based on a property of a surface identifier created using the shape memory material. For example, the surface identifier may be printed or affixed onto the shape memory material or otherwise affected by the shape memory material, and the shape memory material phase change may alter a property of a surface identifier. A camera or other sensor may capture information about the surface identifier, and the information may be used to authenticate the surface identifier, such as based on stored authentication information. In one implementation, the object is further authenticated based on a second phase, such as where the shape memory material is triggered to enter a second phase, and information about the surface identifier when the shape memory material is in the second phase is used to further authenticate the object.

In one implementation, a surface identifier that experiences a property change based on a phase change of a shape memory material may be used with a workflow. For example, a stage or user of a workflow may be authenticated or identified when the shape memory material is in a first phase, and the shape memory material may be caused to enter a second phase such that the surface identifier may then be used to authenticate or identify a second stage or user. As another example, information revealed by the surface identifier, may lead to another workflow or additional information, such as where the surface identifier is part of a dual authentication method. A surface identifier created using a shape memory material may allow for multiple uses of the surface identifier based on property changes triggered by phase changes of the shape memory material.

The invention claimed is:

1. A computing system, comprising:
   a storage to store information about surface identifier properties including a first value of a property associated with a first phase and a second value of a property associated with a second phase;
   a manufacturing device; and
   a processor to:
      access the surface identifier properties that are stored; and
      create a surface identifier using a shape memory material, including causing the manufacturing device to position the shape memory material to create the surface identifier, wherein the shape memory material causes the surface identifier to have the first value of the property when the shape memory material is in the first phase, and wherein the shape memory material causes the surface identifier to have the second value of the property when the shape memory material is in the second phase, wherein the shape memory material comprises an alloy that has an austenite phase and a martensite phase as the first phase and the second phase.

2. The computing system of claim 1, wherein the manufacturing device comprises a 3D printer.

3. The computing system of claim 1, wherein the property of the first phase or the property of the second phase comprises at least one of an optical property or a haptic property.

4. The computing system of claim 3, wherein the property of the first phase or the property of the second phase comprises an optical property and the first value of the property of the first phase compared to the second value of the property of the second phase comprises a change to at least one of: size, shape, color, transparency, emission, florescence, plasmonic effect, visibility, revelation of a holographic element, and concealment of a holographic element.

5. The computing system of claim 3, wherein the property of the first phase or the property of the second phase comprises a haptic property and wherein a haptic element in the surface identifier is present when the shape memory material is in the first phase and is not present when the shape memory material is in the second phase.

6. The computing system of claim 1, further comprising a printer, and wherein creating the surface identifier further comprises:
 causing the shape memory material to enter the first phase; and
 printing information related to the surface identifier onto the shape memory material while the shape memory material is in the first phase.

7. A method, comprising:
 determining a surface identifier to associate with an object; and
 positioning, by a manufacturing device, a shape memory material to create the surface identifier by using the shape memory material to at least one of form or receive the determined surface identifier, wherein a property of the surface identifier changes to a predetermined value when the shape memory material transitions to a different phase, wherein the shape memory material comprises an alloy that has an austenite phase and a martensite phase.

8. The method of claim 7, further comprising:
 causing the shape memory material to enter a first phase; and
 printing information related to the surface identifier while the shape memory material is in the first phase.

9. The method of claim 8, further comprising:
 causing the shape memory material to enter a second phase; and
 printing information related to the surface identifier while the shape memory material is the second phase.

10. The method of claim 7, further comprising:
 causing the shape memory material to enter a first phase; and
 authenticating the object based on the property of the surface identifier while the shape memory material is in the first phase.

11. The method of claim 7, further comprising:
 authenticating the object based on the property of the surface identifier when the shape memory material is in a first phase and the property of the surface identifier when the shape memory material is in a second phase.

12. The method of claim 7, wherein the property comprises at least one of an optical property or a haptic property.

13. The method of claim 7, wherein positioning the shape memory material comprises positioning the shape memory material using at least one of additive manufacturing and surface manufacturing.

14. An apparatus, comprising:
 an object; and
 a surface identifier associated with the object, wherein the surface identifier is created using a shape memory material and wherein the surface identifier exhibits a first property value when the shape memory material is in a first phase and exhibits a second property value when the shape memory material is in a second phase, wherein the shape memory material comprises an alloy that has an austenite phase and a martensite phase as the first phase and the second phase.

15. The machine-readable non-transitory storage medium of claim 14, wherein a change to the first property value or the second property value comprises a change to at least one of: an optical property or a haptic property.

* * * * *